(12) United States Patent
Kawakubo et al.

(10) Patent No.: US 8,443,689 B2
(45) Date of Patent: May 21, 2013

(54) RACK SHAFT SUPPORT DEVICE AND TORSION AMOUNT ADJUSTMENT METHOD FOR TORSION SPRING USED THEREIN

(75) Inventors: Akitake Kawakubo, Nara (JP); Yoshinori Suzuki, Okazaki (JP); Hirofumi Ishimi, Katsuragi (JP)

(73) Assignee: JTekt Corporation, Osaka-Shi (JP)

( * ) Notice: Subject to any disclaimer, the term of this patent is extended or adjusted under 35 U.S.C. 154(b) by 177 days.

(21) Appl. No.: 12/458,769

(22) Filed: Jul. 22, 2009

(65) Prior Publication Data

US 2010/0018337 A1 Jan. 28, 2010

(30) Foreign Application Priority Data

Jul. 23, 2008 (JP) ................................ 2008-190205

(51) Int. Cl.
*F16H 1/04* (2006.01)
(52) U.S. Cl.
USPC .......................................................... 74/422
(58) Field of Classification Search
USPC ................... 74/29, 422, 388 PS, 409
See application file for complete search history.

(56) References Cited

U.S. PATENT DOCUMENTS

| | | | | |
|---|---|---|---|---|
| 4,731,905 A | * | 3/1988 | Milano et al. | 16/306 |
| 5,718,149 A | * | 2/1998 | Phillips | 74/422 |
| 7,360,467 B2 | * | 4/2008 | Segawa et al. | 74/425 |
| 7,487,984 B1 | * | 2/2009 | Lemont et al. | 280/93.514 |
| 7,930,951 B2 | * | 4/2011 | Eickholt | 74/388 PS |
| 2007/0209463 A1 | * | 9/2007 | Song et al. | 74/388 PS |
| 2008/0295629 A1 | * | 12/2008 | Song | 74/422 |
| 2010/0024583 A1 | * | 2/2010 | Kawakubo et al. | 74/422 |

FOREIGN PATENT DOCUMENTS

| | | |
|---|---|---|
| JP | A-4-368283 | 12/1992 |
| JP | U-6-81870 | 11/1994 |
| JP | A-2007-238089 | 9/2007 |

OTHER PUBLICATIONS

Feb. 14, 2013 Office Action issued in Japanese Patent Application No. 2008-190205 (w/translation).

* cited by examiner

*Primary Examiner* — Troy Chambers
*Assistant Examiner* — Michael Gonzalez
(74) *Attorney, Agent, or Firm* — Oliff & Berridge, PLC (57) ABSTRACT

A rack shaft support device includes: a rack shaft support member that slidably supports a rack shaft; a sealing member fixed to an inlet port of a retention hole formed in a housing; an intermediate member that is interposed between the rack shaft support member and the sealing member; a torsion spring that couples the intermediate member so that torque is transmitted to the intermediate member; a torsion amount adjusting member that is attached to the sealing member in such a manner that a position of the torsion amount adjusting member with respect to the sealing member is adjustable and adjusts a torsion amount of the torsion spring; and a cam mechanism that converts a rotation force of the intermediate member induced by untwisting of the torsion spring into a force by which the intermediate member pushes the rack shaft support member.

4 Claims, 7 Drawing Sheets

RACK SHAFT SUPPORT DEVICE AND TORSION AMOUNT ADJUSTMENT METHOD FOR TORSION SPRING USED THEREIN

INCORPORATION BY REFERENCE

The disclosure of Japanese Patent Application No. 2008-190205 filed on Jul. 23, 2008 including the specification drawings and abstract is incorporated herein by reference in its entirety.

BACKGROUND OF THE INVENTION

1. Field of the Invention

The invention relates to a rack shaft support device and a method for adjusting a torsion amount of a torsion spring that is used therein.

2. Description of the Related Art

A steering apparatus of a rack-and-pinion system is usually provided with a rack shaft support device for removing backlash between the rack and the pinion. In the rack shaft support device, a support yoke that can slide back and forth and a compression coil spring that biases the support yoke are accommodated in a retention hole provided in a housing. By the support yoke biased by the compression coil spring, the rack shaft is axially slidably supported and also the rack shaft is pushed toward the pinion shaft.

However, as wear of the sliding portions of the rack shaft and support yoke advances in a long-term use, the play of the support yoke in the back-forth direction increases. As a result, rattling sound can be generated. Accordingly, a support yoke gap compensation device for inhibiting the back-forth play of the support yoke has been suggested (see, for example, Japanese Patent Application Publication No. 2007-238089 (JP-A-2007-238089)).

This support yoke gap compensation device is provided with a support yoke having a fixing groove, a yoke spring that provides a biasing force for pushing the support yoke toward a rack bar, a first cam that is disposed at the rear surface of the support yoke and has a first inclined surface, a fixing member that is fitted in the fixing groove and maintains a gap between the support yoke and the first cam, a second cam that has a second inclined surface opposite the first inclined surface and a first groove formed in the central portion, a yoke plug having a second groove formed in the central portion, and a torsion spring disposed in a space between the first groove and the second groove. When a gap appears between the rack bar and the pinion, the second cam is rotated by the extension of the torsion spring and the gap is compensated.

SUMMARY OF THE INVENTION

The torsion spring is disposed in a gap between the first groove and the second groove, but the torsion amount of the torsion bar spring is difficult to set. For this reason, a spread in the pushing force that pushes the rack shaft against the pinion shaft is large. As a result, the occurrence of rattling sound sometimes cannot be prevented. It is an object of the invention to provide a steering apparatus in which the occurrence of noise can be reliably inhibited.

A rack shaft support device according to one aspect of the invention includes a rack shaft support member that is accommodated inside a retention hole formed in a housing so as to be able to slide in an axial direction of the retention hole, and slidably supports a rack shaft; a sealing member fixed to an inlet port of the retention hole; an intermediate member that is interposed between the rack shaft support member and the sealing member and can rotate about a central axial line of the retention hole; a torsion spring that couples the intermediate member so that torque is transmitted to the intermediate member; a torsion amount adjusting member that is attached to the sealing member in such a manner that a position of the torsion amount adjusting member with respect to the sealing member is adjustable and adjusts a torsion amount of the torsion spring; and a cam mechanism that converts a rotation force of the intermediate member induced by untwisting of the torsion spring into a force by which the intermediate member pushes the rack shaft support member.

According to the above-described aspect, the torsion amount of the torsion spring can be adjusted with the torsion amount adjusting member that is attached to the sealing member in such a manner that a position of the torsion amount adjusting member with respect to the sealing member is adjustable. As a result, the torsional torque generated by the torsion spring can be controlled with good accuracy. Therefore, a spread in the pushing force in the meshing portion of the rack and pinion can be inhibited. As wear of the sliding portions of the rack shaft support member and rack shaft advances, the intermediate member is rotated by the torsion spring. As a result, the intermediate member pushes the rack shaft support member toward the rack shaft by the movement of the cam mechanism, thereby making it possible to maintain a substantially constant pushing force in the meshing portion of the rack shaft and pinion.

In the rack shaft support device according to the above-described aspect, the torsion amount adjusting member may include an adjustment screw that is screwed into a threaded hole provided in the sealing member, the adjustment screw may include a first end portion that is exposed to the outside of the sealing member and a second end portion that faces the intermediate member, the first end portion may be provided with an operation portion for operating the adjustment screw; and coupling portions for coupling respective end portions of the torsion spring may be provided at the second end portion of the adjustment screw and the intermediate member.

In this case, by operating the operation portion of the first end portion of the adjustment screw from the outside of the sealing member and adjusting the screwing position of the adjustment screw with respect to the threaded hole of the sealing member, it is possible to rotate also the other end portion of the torsion spring that is coupled to the coupling portion of the second end portion of the adjustment screw. As a result, the torsion amount of the torsion spring can be adjusted with good accuracy from the outside of the sealing member.

In the rack shaft support device according to the above-described aspect, the torsion spring may be a torsion coil spring; the end portions of the torsion coil spring may be bent linearly inward so as to be perpendicular to the coil central axial line of the torsion coil spring, and the coupling portions of the adjustment screw and the intermediate member may be coupling grooves into which the respective end portions of the torsion coil spring are fitted.

In this case, the end portions of the torsion coil spring that are perpendicular to the coil central axial line are mated with the coupling grooves of the adjustment screw and intermediate member. Therefore, the torsion coil spring can be twisted, without tumbling, about the coil central axial line thereof. As a result, a spread of the torsional torque with respect to the torsion amount can be inhibited.

In the rack shaft support device according to the above-described aspect, a threaded hole may be provided in the intermediate member; a fixing jig insertion hole may be provided in the sealing member; the threaded hole and the fixing jig insertion hole may be provided to be in a row on the same axial line when the intermediate member is in a predetermined rotation position; and the sealing member and the intermediate member can be fixed to each other by using a fixing jig screwed in the threaded hole through the fixing jig insertion hole.

In this case, the intermediate member can be fixed with respect to the sealing member in the axial direction and rotation direction by using a fixing jig screwed in the threaded hole of the intermediate member through the fixing jig insertion hole of the sealing member. In this state, the torsion amount of the torsion spring can be adjusted with good accuracy by using the torsion amount adjusting member that is attached to the sealing member in such a manner that a position of the torsion amount adjusting member with respect to the sealing member is adjustable.

The above-described aspect may be applied to a steering apparatus for a vehicle in which a rack shaft is slidably supported by using the rack shaft support device. With this aspect, a steering apparatus for a vehicle can be attained in which the occurrence of rattling sound can be reliably prevented.

BRIEF DESCRIPTION OF THE DRAWINGS

The features, advantages, and technical and industrial significance of the invention will be described in the following detailed description of example embodiments of the invention with reference to the accompanying drawings, in which like numerals denote like elements, and wherein.

DETAILED DESCRIPTION OF EMBODIMENTS

Figure 1:
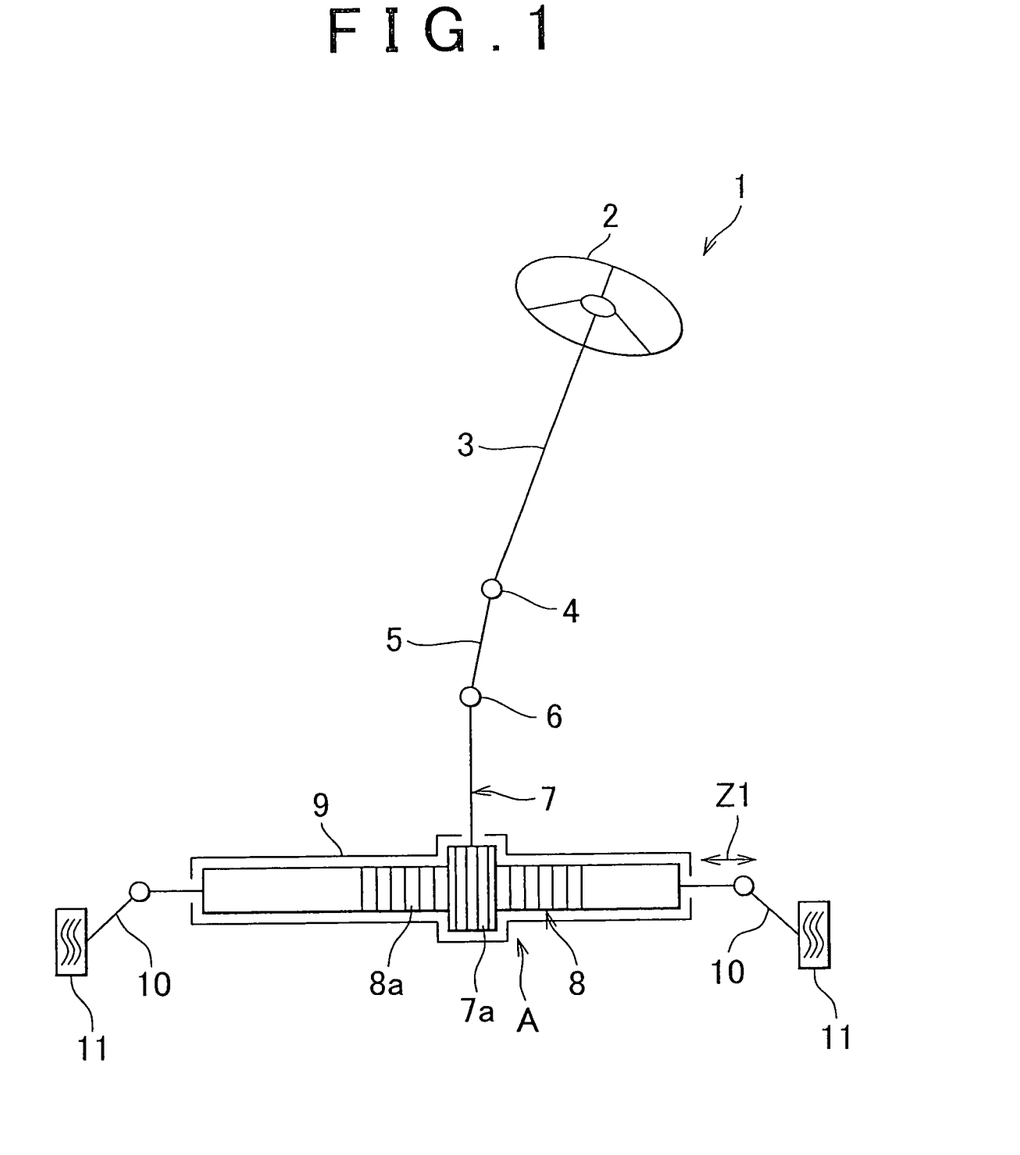
FIG. 1 is a schematic diagram illustrating a general configuration of the rack-and-pinion steering apparatus for a vehicle of one embodiment of the invention.

An embodiment of the invention will be described below with reference to the appended drawings. Referring to FIG. 1, a steering apparatus 1 for a vehicle includes a steering shaft 3 that is coupled to a steering member 2 such as a steering wheel, an intermediate shaft 5 that is coupled via a universal joint 4 to the steering shaft 3, a pinion shaft 7 that is coupled via a universal joint 6 to the intermediate shaft 5, and a rack shaft 8 that has a rack 8a that meshes with a pinion 7a provided in the vicinity of the end portion of the pinion shaft 7 and serves as a steering shaft extending in the transverse direction of an automobile. A rack-and-pinion mechanism A serving as a steering mechanism is constituted by the pinion shaft 7 and rack shaft 8.

Figure 2:
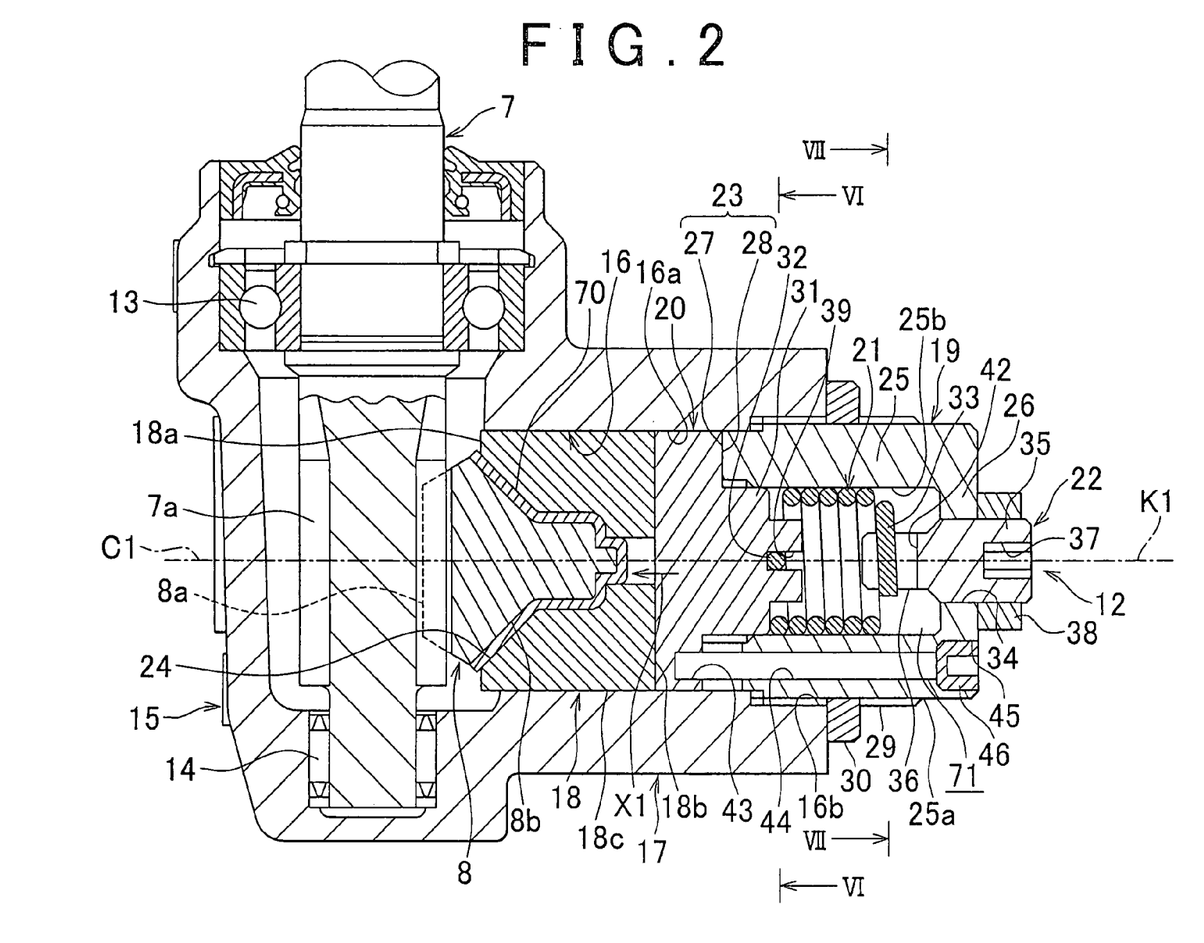
FIG. 2 is a cross-sectional view of a principal portion of the steering apparatus for a vehicle that uses the rack shaft support device.

The rack shaft 8 is supported, so that it can reciprocate linearly along an axial direction Z1, by a plurality of bearings (not shown in the figure) inside a rack housing 9 that is fixed to the vehicle body. Both end portions of the rack shaft 8 protrude to both sides of the rack housing 9 and respective tie rods 10 are joined to these end portions. Each tie rod 10 is coupled to a corresponding wheel 11 via a corresponding knuckle arm (not shown in the figure).

Where the steering member 2 is operated and the steering shaft 3 is rotated, this rotation is converted by the pinion 7a and rack 8a into a linear motion of the rack shaft 8 disposed along the transverse direction of the automobile. As a result, the wheel 11 is steered. Referring to FIG. 2, the pinion shaft 7 is rotatably supported inside a pinion housing 15 by a first bearing 13 composed, for example, of a ball bearing, and a second bearing 14 composed, for example, of a cylindrical roller bearing. The pinion 7a of the pinion shaft 7 and the rack 8a of the rack shaft 8 are meshed together inside the pinion housing 15.

The steering apparatus 1 for a vehicle is equipped with a rack shaft support device 12. The rack shaft 8 is axially slidably supported, so that it can slide along the axial longitudinal direction thereof (in FIG. 2, the direction perpendicular to the paper sheet), by the rack shaft support device 12 and a bearing (not shown in the figure) that is provided inside the rack housing 9 (see FIG. 1) coupled to the pinion housing 15. The rack shaft support device 12 is provided with a housing 17 that has a retention hole 16 configured by a round hole, a support yoke 18 serving as a rack shaft support member that is accommodated in the retention hole 16, so that it can slide along a depth direction X1 of the retention hole 16 (axial direction of the retention hole 16), and slidably supports a rear surface 8b of the rack 8a of the rack shaft 8, a sealing member 19 that is fixed by screwing into an inlet port of the retention hole 16, and an intermediate member 20 that is interposed between the support yoke 18 and sealing member 19 and can rotate about the central axial line C1 of the retention hole 16.

Further, the rack shaft support device 12 is also provided with a torsion coil spring 21 serving as a torsion spring that couples the intermediate member 20 so that torque is transmitted to the intermediate member 20, an adjustment screw 22 as a torsion amount adjusting member that is attached to the sealing member 19 in such a manner that a position of the adjustment screw 22 with respect to the sealing member 19 is adjustable and serves to adjust the torsion amount of the torsion coil spring 21, and a cam mechanism 23 provided on mutually opposing portions of the sealing member 19 and intermediate member 20. The cam mechanism 23 has a function of converting the rotation of the intermediate member 20 caused by untwisting of the torsion coil spring 21 into axial movement of the intermediate member 20 toward the support yoke 18.

The housing 17 of the rack shaft support device 12 is formed integrally with the pinion housing 15 and disposed on the opposite side from the pinion shaft 7, the rack shaft 8 being interposed therebetween. The pinion housing 15 and housing 17 are produced, for example, by die casting. The support yoke 18 serving as a rack shaft support member has a front surface 18a that faces the rack shaft 8, a rear surface 18b as an opposing surface that faces the intermediate member 20, and an outer peripheral surface 18c configured by a cylindrical surface. A concave surface 24 that generally matches in shape a rear surface 8b of the rack shaft 8 is formed at the front surface 18a of the support yoke 18, and a sliding contact plate 70 is attached so as to follow the concave surface 24. The sliding contact plate 70 is in sliding contact with the rear surface 8b of the rack shaft 8. A plate having a low friction coefficient is preferably used as the sliding contact plate 70. For example, a metal plate or a metal plate covered with a fluororesin can be used as the sliding contact plate.

Figure 3:
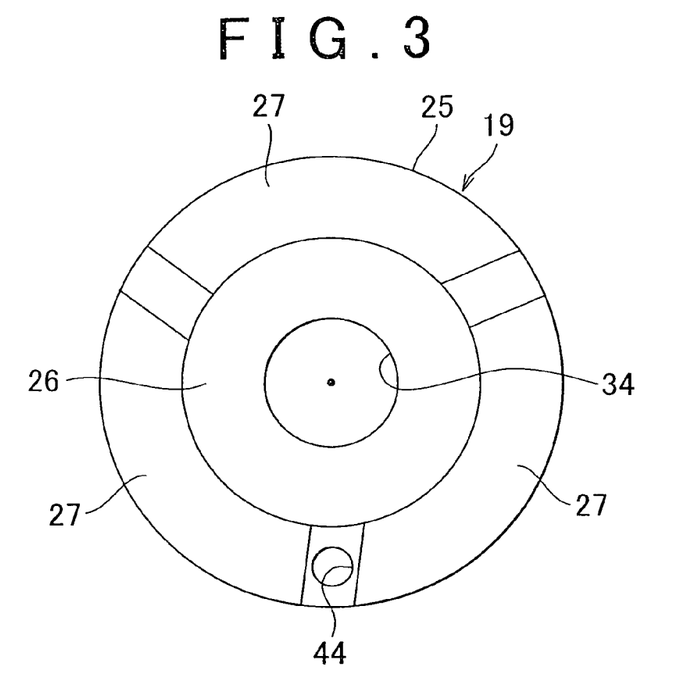
FIG. 3 is a schematic view of the end surface of the sealing member.

The sealing member 19 has a cylindrical portion 25, and an end wall 26 that closes one end of the cylindrical portion 25. Referring to FIGS. 2 and 3, a plurality of cam surfaces 27 are formed at the annular other end of the cylindrical portion 25. As shown in FIG. 3, the plurality of cam surfaces 27 are disposed equidistantly in the circumferential direction of the cylindrical portion 25. The height (in FIG. 3, in the direction perpendicular to the paper sheet) of each cam surface 27 is made to vary along the circumferential direction of the cylindrical portion 25.

Figure 4:
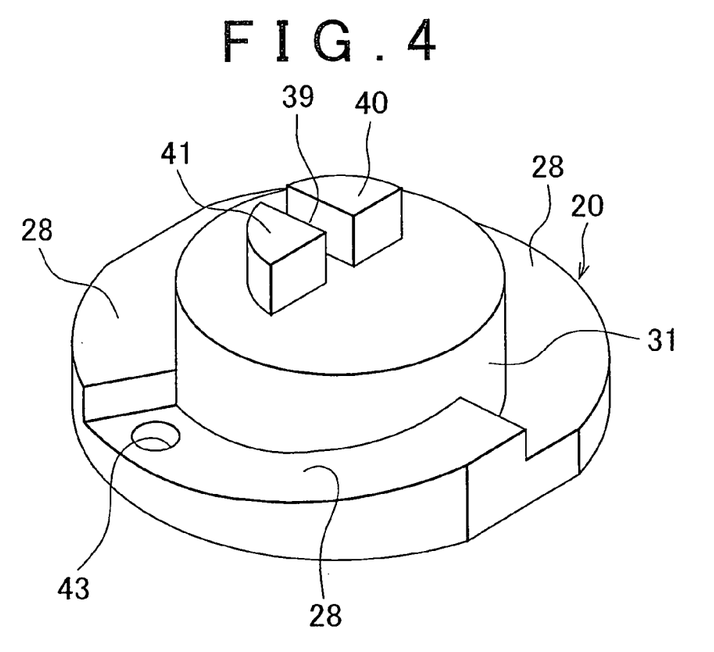
FIG. 4 is a schematic perspective view of the intermediate member.

Referring to FIGS. 2 and 4, the intermediate member 20 has formed therein an annular cam follower surface 28 that faces the cam surface 27. The abovementioned cam mechanism 23 is constituted by the cam surface 27 and cam follower 28. Again referring to FIG. 2, a male thread 29 is formed at the outer periphery 25a of the cylindrical portion 25. In the inlet portion of the retention hole 16, a female thread portion 16b is formed at the inner peripheral surface 16a of the retention hole 16, and the male thread 29 of the sealing member 19 is screwed in and fixed to the female threaded portion 16b. By applying pressure to the end surface of the housing 17 with a lock nut 30 that is screwed on the male thread 29 on the outer periphery of the sealing member 19, the sealing member 19 is locked to the housing 17.

Referring to FIGS. 2 and 4, the intermediate member 20 has a boss 31 provided on the inner side of the annular cam follower surface 28. This boss 31 is rotatably mated with an inner periphery 25b of the cylindrical portion 25. Inside the sealing member 19 having a tubular shape, an accommodation space 71 for accommodating the torsion coil spring 21 is formed between the boss 31 of the intermediate member 20 and the end wall 26 of the sealing member 19.

Figure 5A:
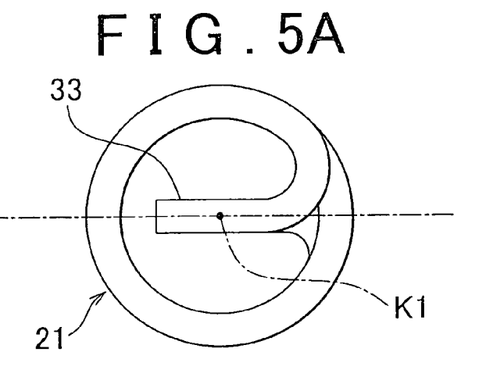
FIG. 5A is a top view of the torsion coil spring.
Figure 5B:
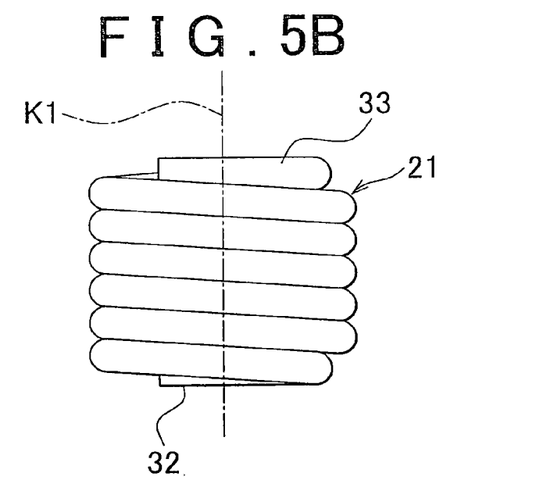
FIG. 5B is a side view of the torsion coil spring.
Figure 5C:
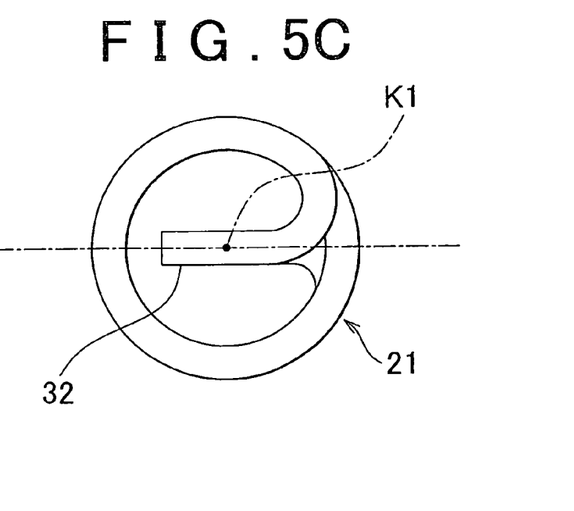
FIG. 5C is a bottom view of the torsion coil spring.

Referring to FIGS. 2, 5A, 5B, and 5C, the torsion coil spring 21 has first and second end portions 32 and 33, and the first and second end portions 32 and 33 are bent linearly inward to be perpendicular to a coil central axial line K1 of the torsion coil spring 21. The first end portion 32 and second end portion 33 may be arranged along each other in the same direction, as shown in FIGS. 5A and 5C, where the torsion coil spring 21 in a free state is viewed along the coil central axial line K1.

Referring to FIG. 2, the adjustment screw 22 serving as a torsion amount adjusting member is screwed into a threaded hole 34 that passes through the end wall 26 of the sealing member 19. The adjustment screw 22 has a first end portion 35 that is exposed to the outside from the end wall 26 of the sealing member 19 and a second end portion 36 that faces the intermediate member 20 inside the sealing member 19 (that is, inside the accommodation space 71). The first end portion 35 is provided with an operation portion 37 for operating the adjustment screw 22. The operation portion 37 is, for example, a hexagonal hole formed in the first end portion 35.

Figure 6:
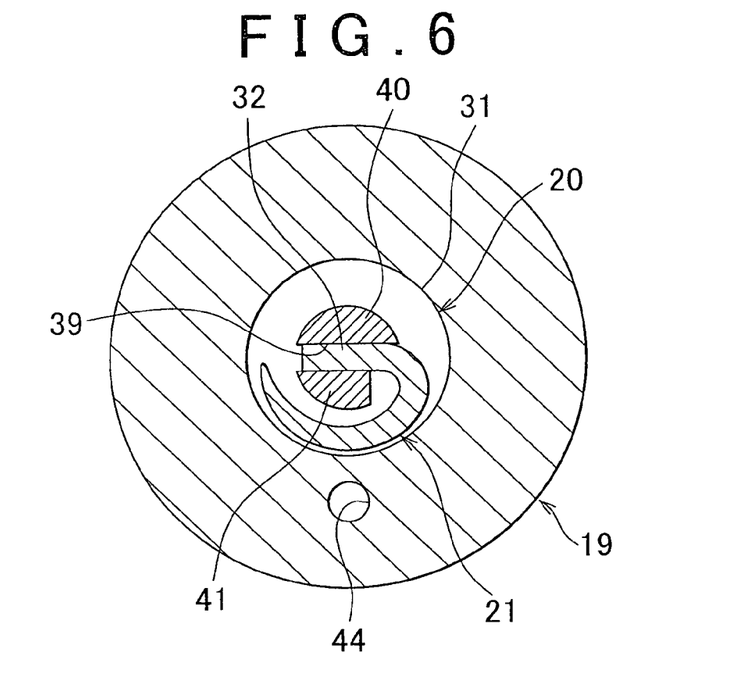
FIG. 6 is a cross-sectional view along the VI-VI line in FIG. 2.

By applying pressure to the end wall 26 of the sealing member 19 with a lock nut 38 that is engaged with the outer periphery of the first end portion 35 of the adjustment screw 22, the adjustment screw 22 is locked to the sealing member 19. As shown in FIG. 4, a pair of protrusions 40, 41 that delineate therebetween a coupling groove 39 serving as a coupling portion are formed at the end surface of the boss 31 of the intermediate member 20. As shown in FIG. 6, which is a cross-sectional view along the VI-VI line in FIG. 2, the first end portion 32 of the torsion coil spring 21 is fitted into the coupling groove 39, thereby ensuring coupling such that the first end portion 32 of the torsion coil spring 21 and the intermediate member 20 rotate together.

Figure 7:
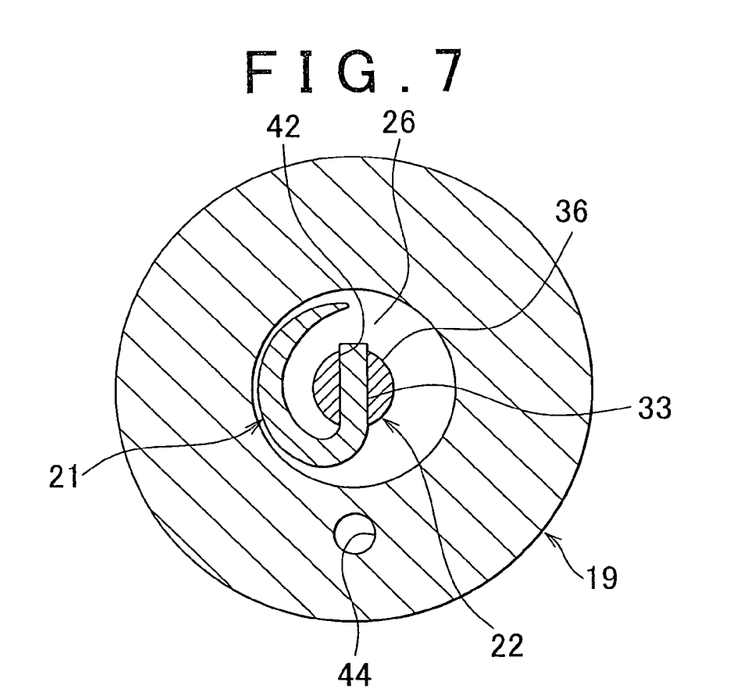
FIG. 7 is a cross-sectional view along the VII-VII line in FIG. 2.
Figure 8:
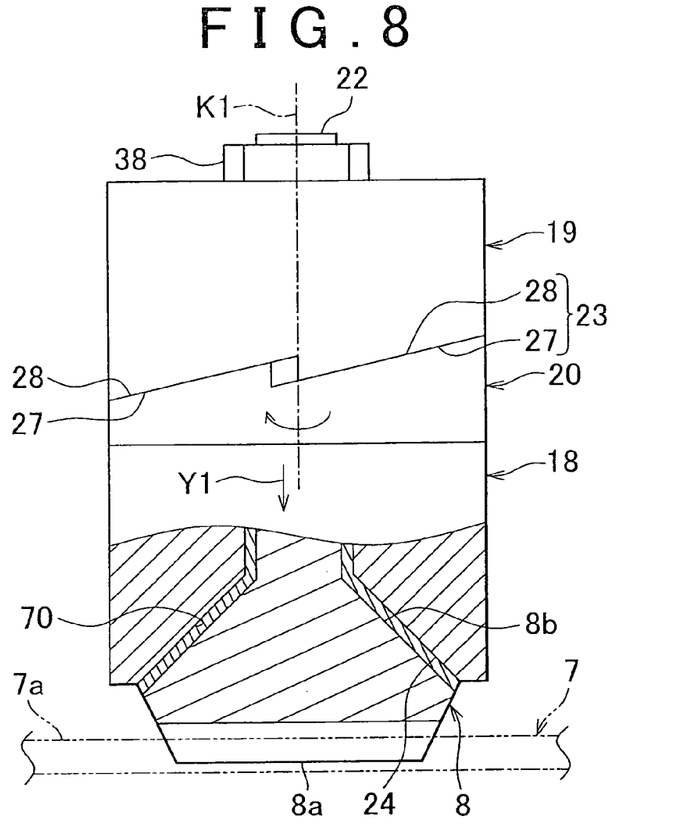
FIG. 8 is a side view, with a partial cut-out, of the principal portion of the rack shaft support device.

Further, as shown in FIG. 2, a coupling groove 42 serving as a coupling portion is formed at the second end portion 36 of the adjustment screw 22. As shown in FIG. 7, which is a cross-sectional view along the VII-VII line in FIG. 2, the second end portion 33 of the torsion coil spring 21 is fitted into the coupling groove 42, thereby ensuring coupling such that the second end portion 33 of the torsion coil spring 21 and the adjustment screw 22 rotate together.

Where the torsion coil spring 21 is untwisted, the intermediate member 20 rotates with respect to the sealing member 19, as shown in FIG. 8. As a result, the force induced by the rotation of the intermediate member 20 (rotation force) is converted by the movement of the cam surface 27 and cam follower surface 28 of the cam mechanism 23 into a force by which the intermediate member 20 pushes the support yoke 18 to the rack shaft 8. More specifically, the intermediate member 20 moves the support yoke 18 in the direction Y1 of pushing toward the rack shaft 8.

Referring to FIGS. 2 and 4, in the intermediate member 20, a threaded hole 43 is formed parallel to the central axial line of the intermediate member 20. Referring to FIGS. 2 and 3, a fixing jig insertion hole 44 is formed in the sealing member 19. When the intermediate member 20 is in a predetermined rotation position, the threaded hole 43 of the intermediate member 20 and the fixing jig insertion hole 44 of the sealing member 19 are arranged in a row on the same axial line.

Figure 9:
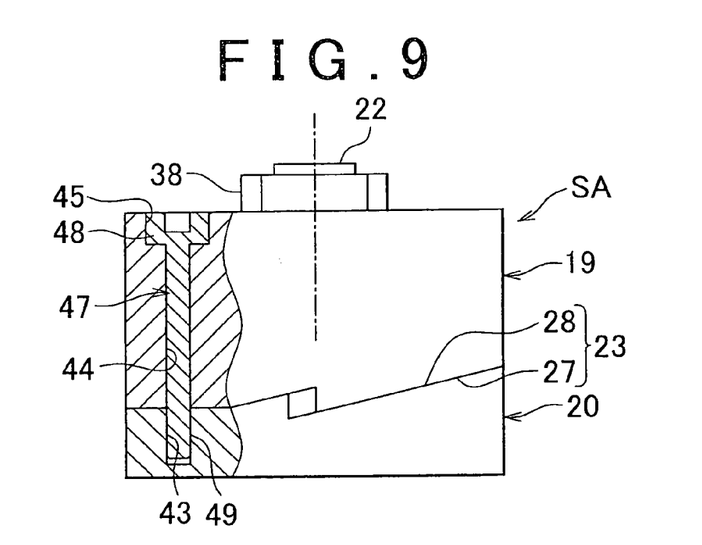
FIG. 9 is a side view, with a partial cut-out, of a sub-assembly including the sealing member, intermediate member, torsion coil spring, and adjustment screw.

As shown in FIG. 2, a large-diameter portion 45 with an inner diameter larger than the inner diameter of the fixing jig insertion hole 44 is formed in the inlet port of the fixing jig insertion hole 44. A plug 46 is fitted into the large-diameter portion 45, thereby closing the inlet port of the fixing jig insertion hole 44. More specifically, a male thread constituting the plug 46 is screwed into a female thread formed on the inner periphery of the large-diameter portion 45. In the intermediate assembling process of the rack shaft support device 12 (process of adjusting the torsion amount of the torsion coil spring 21 with the adjustment screw 22), as shown in FIG. 9, the sealing member 19 and intermediate member 20 can be fixed to each other by using a fixing tool 47 that has been screwed into the threaded hole 43 through the fixing jig insertion hole 44. More specifically, a sub-assembly SA is configured that includes the fixing tool 47, sealing member 19, intermediate member 20, torsion coil spring 21 (not shown in FIG. 9), and adjustment screw 22.

The fixing jig 47 is constituted by a screw having a head portion 48 and a thread portion 49 formed at the distal end thereof. The fixing jig 47 is inserted through the fixing jig insertion hole 44 of the sealing member 19, and a thread portion 49 at the distal end of the fixing jig 47 is screwed into the threaded hole 43 of the intermediate member. The head portion 48 is received by the bottom of the large-diameter portion 45 of the inlet port of the fixing jig insertion hole 44 of the sealing member 19. As a result, the sealing member 19 and intermediate member 20 are fixed by the fixing jig 47.

Where the adjustment screw 22 is rotated through a predetermined angle in a state in which the sealing member 19 and intermediate member 20 are thus fixed by the fixing jig 47, the torsion amount of the torsion coil spring 21 located inside the sealing member 19 is adjusted with good accuracy, the adjusted adjustment screw 22 is then locked using the lock nut 38, the fixing jig 47 is removed, and the plug 46 is attached. With the present embodiment, the torsion amount of the torsion coil spring 21 can be adjusted with the adjustment screw 22 that is attached to the sealing member 19 in such a manner that a position of the adjustment screw 22 with respect to the sealing member 19 is adjustable. As a result, the torsional torque generated by the torsion coil spring 21 can be controlled with good accuracy. Therefore, a spread in the pushing force in the meshing portion of the rack 8a and pinion 7a can be inhibited.

As wear of the sliding portions of the support yoke 18 and rack shaft 8 advances, the torsion coil spring 21 is untwisted, thereby rotating the intermediate member 20. As a result, as shown in FIG. 8, the intermediate member 20 is driven toward the support yoke 18 by the movement of the cam mechanism 23 formed between the sealing member 19 and intermediate member 20. A constant pushing force in the meshing portion of the rack 8a and pinion 7a can thus be maintained over a long period. As a result, noise can be reliably prevented over a long period.

Therefore, in the steering apparatus 1 for a vehicle that uses the rack shaft support device 12, the deterioration of steering feeling that follows the excessive increase in the pushing force in the meshing portion of the rack 8a and pinion 7a is prevented. In addition, noise can be reliably inhibited. Further, as shown in FIG. 2, the adjustment screw 22 that is screwed into the threaded hole 34 of the sealing member 19 is used as a torsion amount adjusting member that adjusts the torsion amount of the torsion coil spring 21, and the first end portion 35 of the adjustment screw 22 has an operation 2Q portion 37 and is exposed to the outside of the sealing member 19. Therefore, the torsion amount of the torsion coil spring 21 can be adjusted by operating the adjustment screw 22 from the outside of the sealing member 19 and rotating the second end portion 33 of the torsion coil spring 21. Thus, the torsion amount of the torsion coil spring 21 can be adjusted with good accuracy by adjusting the screwing position of the adjustment 26 screw 22 with respect to the threaded hole 34 from the outside.

Further, as shown in FIGS. 5A to 5C, the first and second end portions 32 and 33 of the torsion coil spring 21 serving as a torsion spring are bent linearly inward to be perpendicular to a coil central axial line K1 of the torsion coil spring 21. As shown in FIGS. 6 and 7, the first and second end portions 32 and 33 are fitted into coupling grooves 39 and 42 of the intermediate member 20 and adjustment screw 22, respectively. Therefore, the torsion coil spring 21 can be twisted, without tumbling, about the coil central axial line K1. As a result, a spread of the torsional torque with respect to the torsion amount can be inhibited.

Further, the configuration is such that when the intermediate member 20 is in a predetermined rotation position, the threaded hole 43 of the intermediate member 20 and the fixing jig insertion hole 44 of the sealing member 19 are arranged in a row on the same axial line. Therefore, in the process of assembling the rack shaft support device 12, the rotation of the intermediate member 20 with respect to the sealing member 19 can be stopped by using the fixing jig 47 screwed into the threaded hole 43 of the intermediate member 20 through the fixing jig insertion hole 44 of the sealing member 19. In this state, the torsion amount of the torsion coil spring 21 can be adjusted with good accuracy by using the adjustment screw 22 that is attached to the sealing member 19 in such a manner that a position of the adjustment screw 22 with respect to the sealing member 19 is adjustable.

Thus, when the torsion amount of the torsion coil spring 21 is adjusted using the adjustment screw 22, the sealing member 19 and intermediate member 20 are fixed without play by the fixing jig 47 and the torsion amount of the torsion coil spring 21 can be adjusted with good accuracy. In particular, because the fixing jig 47 is screwed in the threaded hole 43 of the intermediate member 20, and the sealing member 19 and intermediate member 20 are fixed in the axial direction and rotation direction, the following advantages are gained.

Assuming a case in which the sealing member 19 and intermediate member 20 are not fixed in the axial direction, when the torsion coil spring 21 is twisted, the sealing member 19 and intermediate member 20 can be inclined with respect to each other by a repulsion force of the torsion coil spring 21 in the axial direction. In a case where the two members are inclined, a gap appears between the cam surface 27 and cam follower surface 28 of the cam mechanism 23 and the mutual arrangement of the cam surface 27 and cam follower surface 28 is changed. As a result, the torsional torque of the torsion coil spring 21 cannot be set with good accuracy.

By contrast in the present embodiment, when the torsion coil spring 21 is twisted, the sealing member 19 and intermediate member 20 are not inclined with respect to each other and the cam surface 27 and cam follower surface 28 can be maintained in intimate contact with each other. Furthermore, the mutual arrangement of the cam surface 27 and cam follower surface 28 is not changed. As a result, the torsional torque of the torsion coil spring 21 can be set with good accuracy.

Figure 10:
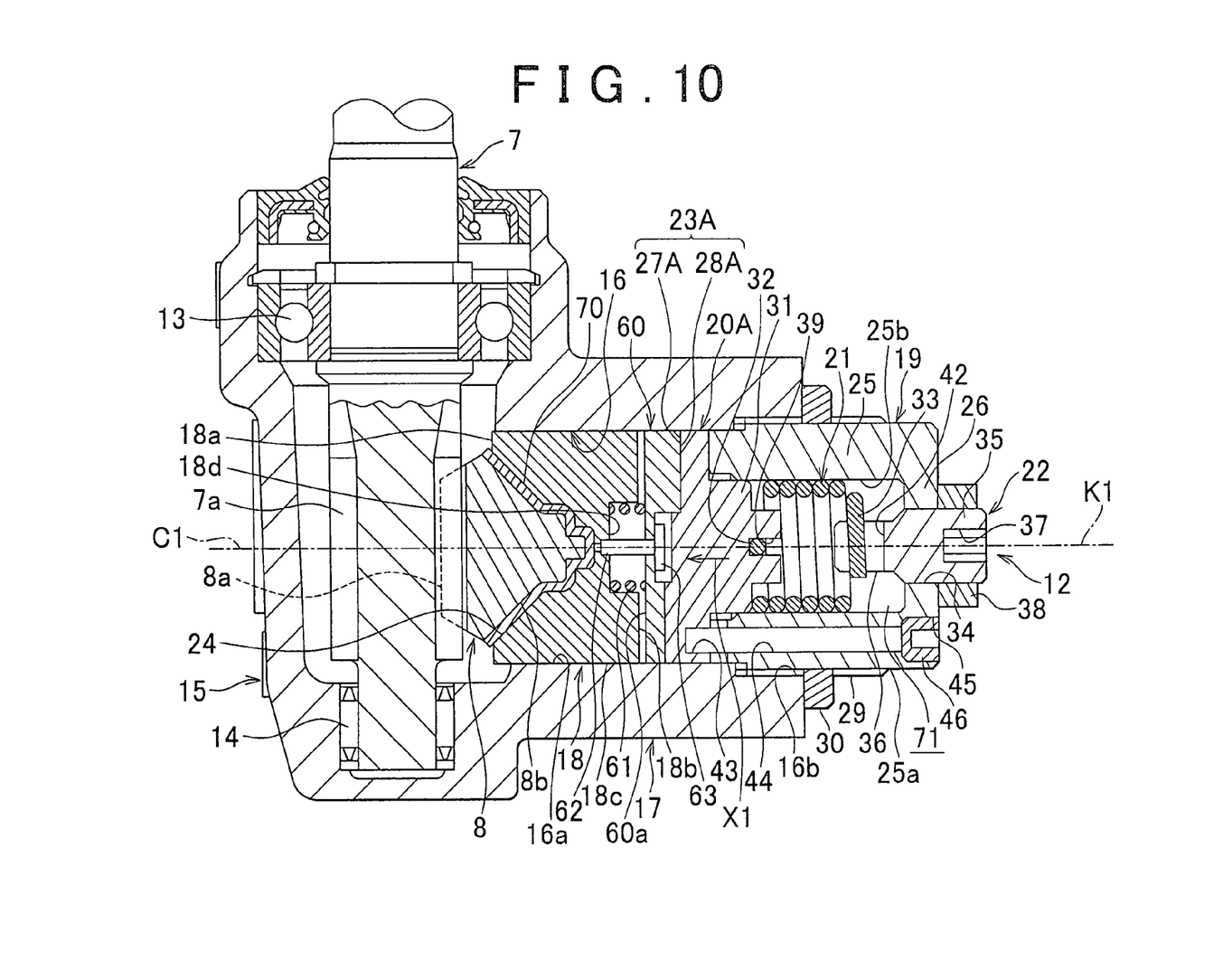
FIG. 10 is a cross-sectional view of the principal portion of the steering apparatus for a vehicle that uses the rack shaft support device of another embodiment of the invention.

After the torsion amount of the torsion coil spring 21 has been adjusted by the adjustment screw 22, the fixing jig 47 is removed and the inlet port of the fixing jig insertion hole 44 is closed with the plug 46. Therefore, moisture or dust is prevented from penetrating into the sealing member 19. In the embodiment shown in FIG. 2, the cam mechanism 23 is constituted by the cam surface 27 provided at the sealing member 19 and the cam follower surface 28 provided at the intermediate member 20, but such a configuration is not limiting. For example, as shown in FIG. 10, a cam follower surface forming member 60 interposed between an intermediate member 20A and support yoke 18 may be provided and a cam mechanism 23A may be constituted by a cam surface 27A provided at the intermediate member 20A and a cam follower surface 28A formed by the cam follower surface forming member 60. In this case, the cam follower surface forming member 60 is held so that it can slide in the thickness direction X1 of the retention hole 16, but cannot rotate inside the retention hole 16.

In order to form a gap between the rear surface 18b of the support yoke 18 and the opposing surface 60a of the cam follower surface forming member 60 that faces the rear surface, for example, a compression spring 61 configured by a compression coil spring is interposed in an elastically compressed state between a concave portion 18d formed in the rear surface 18b of the support yoke 18 and the opposing surface 60a of the cam follower surface forming member 60. Further, a shaft-like fixing member 62 fixed to a fixing hole of the concave portion 18d of the support yoke 18 passes through the cam follower surface forming member 60, and the cam follower surface forming member 60 is supported so that it can move through a predetermined distance in the axial direction of the fixing member 62. Thus, when an engagement portion 63 formed at the end portion of the fixing member 62 is engaged with the cam follower surface forming member 60, a gap necessary to absorb deformations is ensured between the rear surface 18b of the support yoke 18 and the opposing surface 60a of the cam follower surface forming member 60 that faces the rear surface.

Further, the invention is not limited to the above-described embodiments and, for example, the cam mechanism may be constituted by a cam surface provided in the intermediate member and a cam follower surface provided in the support yoke (this configuration is not shown in the figure). Various other changes to the invention may be made without departing from the scope of the claims.

What is claimed is:

1. A rack shaft support device comprising:
   a rack shaft support member that is accommodated inside a retention hole formed in a housing so as to be able to slide in an axial direction of the retention hole, and slidably supports a rack shaft;
   a sealing member fixed to an inlet port of the retention hole;
   an intermediate member that is interposed between the rack shaft support member and the sealing member and can rotate about a central axial line of the retention hole;
   a torsion spring that couples the intermediate member so that torque is transmitted to the intermediate member;
   a torsion amount adjusting member that is attached to the sealing member in such a manner that a position of the torsion amount adjusting member with respect to the sealing member is adjustable and adjusts a torsion amount of the torsion spring; and
   a cam mechanism that converts a rotation force of the intermediate member induced by untwisting of the torsion spring into a force by which the intermediate member pushes the rack shaft support member, wherein
      a threaded hole is provided in the intermediate member, a fixing jig insertion hole is provided in the sealing member, the threaded hole and the fixing jig insertion hole are provided to be in a row on the same axial line when the intermediate member is in a predetermined rotation position, and the sealing member and the intermediate member can be fixed to each other by using a fixing jig screwed in the threaded hole through the fixing jig insertion hole.

2. The rack shaft support device according to claim 1, wherein the rack shaft is slidably supported by using the rack shaft support device, and the rack shaft support device is used in a steering device for an automobile.

3. The rack shaft support device according to claim 1, wherein the torsion amount adjusting member includes an adjustment screw that is screwed into a threaded hole provided in the sealing member, the adjustment screw includes a first end portion that is exposed to the outside of the sealing member and a second end portion that faces the intermediate member, the first end portion is provided with an operation portion for operating the adjustment screw, and coupling portions for coupling respective end portions of the torsion spring are provided at the second end portion of the adjustment screw and the intermediate member.

4. The rack shaft support device according to claim 3, wherein the torsion spring is a torsion coil spring, the end portions of the torsion coil spring are bent linearly inward so as to be perpendicular to the coil central axial line of the torsion coil spring, and the coupling portions of the adjustment screw and the intermediate member are coupling grooves into which the respective end portions of the torsion coil spring are fitted.

* * * * *